US011137069B2

(12) United States Patent
Appeltauer (10) Patent No.: US 11,137,069 B2
(45) Date of Patent: Oct. 5, 2021

(54) MOTOR VEHICLE TRANSMISSION, PARTICULARLY A MULTISTAGE TRANSMISSION

(71) Applicant: Daimler AG, Stuttgart (DE)

(72) Inventor: Peter Appeltauer, Fellbach (DE)

(73) Assignee: Daimler AG, Stuttgart (DE)

( * ) Notice: Subject to any disclaimer, the term of this patent is extended or adjusted under 35 U.S.C. 154(b) by 948 days.

(21) Appl. No.: 15/741,691

(22) PCT Filed: Jun. 11, 2016

(86) PCT No.: PCT/EP2016/000971
§ 371 (c)(1),
(2) Date: Jan. 3, 2018

(87) PCT Pub. No.: WO2017/005340
PCT Pub. Date: Jan. 12, 2017

(65) Prior Publication Data
US 2018/0195604 A1    Jul. 12, 2018

(30) Foreign Application Priority Data
Jul. 8, 2015   (DE) ..................... 10 2015 008 830.0

(51) Int. Cl.
*F16H 61/32* (2006.01)
*F16H 63/30* (2006.01)
(Continued)

(52) U.S. Cl.
CPC ........... *F16H 61/32* (2013.01); *F16H 61/686* (2013.01); *F16H 63/304* (2013.01);
(Continued)

(58) Field of Classification Search
CPC ...... F16H 61/32; F16H 61/686; F16H 63/304; F16H 3/66; F16H 2200/2012; F16H 2200/2046; F16D 27/115
See application file for complete search history.

(56) References Cited

U.S. PATENT DOCUMENTS 5,078,249 A  *  1/1992  Botterill ................. F16H 3/089
192/93 A
2010/0043586 A1   2/2010  Mohr et al.
(Continued)

FOREIGN PATENT DOCUMENTS

CN         1218152 A    6/1999
CN       103764497 A    4/2014
(Continued)

OTHER PUBLICATIONS

Chinese Office Action issued in Chinese counterpart application No. 201680039635.X dated Aug. 16, 2019, with partial English translation (Eleven (11) pages).
(Continued)

*Primary Examiner* — Tisha D Lewis
(74) *Attorney, Agent, or Firm* — Crowell & Moring LLP (57) ABSTRACT

A motor vehicle transmission, particularly a multistage transmission, includes at least one switchgear unit which includes two coupling elements. An actuator actuates the switchgear unit and an open-loop and/or closed-loop control unit controls the actuator. An inductive connector unit connects the open-loop and/or closed-loop control unit to the actuator and supplies the actuator with electric energy.

4 Claims, 4 Drawing Sheets

(51) Int. Cl.
  *F16H 61/686* (2006.01)
  *F16H 3/66* (2006.01)
  *F16D 27/115* (2006.01)

(52) U.S. Cl.
  CPC .............. *F16D 27/115* (2013.01); *F16H 3/66* (2013.01); *F16H 2200/2012* (2013.01); *F16H 2200/2046* (2013.01)

(56) References Cited

U.S. PATENT DOCUMENTS

2010/0071497 A1    3/2010  Reisch et al.
2011/0306461 A1*  12/2011  Aota ...................... F16H 3/666
                                                          475/275
2014/0315682 A1   10/2014  Helmer et al.

FOREIGN PATENT DOCUMENTS

| CN | 103987983 A | 8/2014 |
|----|----|----|
| DE | 10 2006 049 275 A1 | 4/2008 |
| DE | 10 2008 055 626 A1 | 5/2010 |
| EP | 0 848 178 A2 | 6/1998 |
| EP | 0 905 396 A1 | 3/1999 |
| EP | 0 905 397 A1 | 3/1999 |
| WO | WO 2013/026582 A1 | 2/2013 |

OTHER PUBLICATIONS

German-language European Office Action issued in European counterpart application No. 16 729 776.1-1012 dated Oct. 28, 2019 (Six (6) pages).
PCT/EP2016/000971, International Search Report dated Aug. 30, 2016 (Two (2) pages).
English translation of a Chinese First Office Action issued in Chinese counterpart application No. 201680039635.X dated Dec. 25, 2018 (Four (4) pages).

* cited by examiner

MOTOR VEHICLE TRANSMISSION, PARTICULARLY A MULTISTAGE TRANSMISSION

BACKGROUND AND SUMMARY OF THE INVENTION

The invention relates to a motor vehicle transmission with at least one switchgear unit.

From DE 10 2008 055 626 A1, a motor vehicle transmission is already known, particularly a multistage transmission with at least one switchgear unit, having two coupling elements which are rotatable relative to one another and non-rotatably connectable to one another.

From DE 10 2006 049 275 A1, a motor vehicle transmission of the type in question is known, having at least one switchgear unit which comprises two coupling elements which are rotatable relative to one another and non-rotatably connectable to one another, as well as an electromechanical actuator, and having an open-loop and/or closed-loop control unit which is provided for the at least one actuator, wherein the motor vehicle transmission comprises an inductive connector unit which connects the open-loop and/or closed-loop control unit to the actuator and which is at least provided for supplying the actuator with electric energy.

In particular, the invention addresses the problem of providing a motor vehicle transmission which is improved particularly with regard to its power loss.

The invention proceeds from a motor vehicle transmission, particularly a multistage transmission with at least one switchgear unit, having two coupling elements, which are twistable relative to one another and non-rotatably connectable to one another, as well as an actuator, and with an open-loop and/or closed-loop control unit provided for controlling the at least one actuator.

It is further assumed that the motor vehicle transmission comprises at least one inductive connector unit which connects the open-loop and/or closed-loop control unit to the actuator and which is at least provided to supply the actuator with electric energy. As a result, the switchgear unit can be supplied with electric, energy through transmission components, without the requirement of transfer points at these transmission components. In particular, the actuator can simply be supplied with energy through rotatable transmission components, thus making the realization of an improved energy transfer possible, particularly when compared to hydraulic actuators. Transfer points which require a pressure-resistant sealing can be omitted. Particularly if the switchgear unit is arranged inboard, i.e., an energy supply by at least one rotatably mounted transmission component is absolutely necessary, a power loss can be reduced by omitting transfer points. A multistage transmission can be provided, the power loss of which is comparable to that of a manual transmission. In addition, an operating means system can be simplified if transfer points can be omitted. It is thus possible to provide a motor vehicle transmission which is improved particularly with regard to its power loss. A "open-loop and/or closed-loop control unit" is supposed to refer particularly to a unit with at least one control device. A "control device" is supposed to refer particularly to a unit with a processor unit and a storage unit as well as an operating program stored in the storage unit. Basically, the open-loop and/or closed-loop control unit can comprise a plurality of control devices which are connected to one another and which are preferably provided to communicate with one another by means of a bus system, particularly a CAN bus system. "Provided" is supposed to refer particularly to specifically programmed, designed and/or equipped.

It is further assumed that the inductive connector unit comprises a primary coil on the side of the housing which is connected to the open-loop and/or closed-loop control unit, and a secondary coil on the side of the clutch which is connected to the actuator. As a result, the connector unit can be designed so as to be particularly compact. In particular, the transmission of the control signals and simultaneous transmission of the electric power can be easily realized by means of a primary coil and a secondary coil.

According to the invention, it is proposed that the actuator comprises a planetary gear train according to the Wolfrom principle, wherein the planetary gear train has a sun gear, a planetary gear support, planetary gears arranged in pairs on the planetary gear support, as well as two hollow wheels, wherein one of them is non-rotatably connected to one of the coupling elements.

It is further proposed that the inductive connector unit for the transmission of control signals is provided for controlling and/or monitoring the actuator. It is particularly proposed that the inductive connector unit is provided for the bidirectional transmission of control signals for controlling and/or monitoring the actuator. By simultaneously transmitting control signals by means of the connector unit, a control of the actuator can be designed in a simple manner. In particular, the open-loop and/or closed-loop control unit must only be provided for supplying power for the energy supply of the actuator. An adjustment of the power received by the actuator can be adjusted by an electronic unit of the actuator. Transmission losses by the connector unit can be disregarded if the received power is adjusted. A "transmission of control signals" is supposed to refer particularly to a transmission of signals by modulating an electric field within the connector unit.

It is further proposed that the motor vehicle transmission has at least one gear shaft arranged between the primary coil and the secondary coil, the gear shaft consisting at least to some extent of a material with a low magnetic permeability. As a result, transmission losses can be kept low. Alternatively or additionally, further transmission components, such as a part of the transmission housing, can be arranged between the primary coil and the secondary coil, which preferably also have a low magnetic permeability. A low magnetic permeability is supposed to mean particularly that a relative permeability of a material, of which the at least one transmission component is made, is lower than 300, preferably lower than 200 and particularly preferably lower than 100. Preferably, the gear shaft and/or the transmission component is made of a non-metallic material, such as plastic or ceramics; as a result, a magnetic permeability with a relative permeability lower than 1 can also be realized.

In a particularly advantageous embodiment, the actuator is designed so as to be mechanically self-locking. As a result, the connector unit can be provided for only transmitting power required for the adjustment of the switchgear unit. It can be foregone to provide the connector unit for the transmission of a power which is necessary to maintain the switchgear unit in an open position or a closed position. In addition, it is possible to achieve that the energy intake of the actuator in the open position and the closed position is zero or at least almost zero; as a result, the power loss of the motor vehicle transmission can be further reduced. "Mechanically self-locking" is supposed to mean particularly that the actuator has at least one mechanical system, particularly a transmission, by means of which the actuator receives a currently present setting if an energy input is interrupted. In particular, it does not refer to a catch mechanism which allows for an energy-less immobilization only in predefined settings, such as an open position or a closed position. A "switch position" in this context is supposed to refer particularly to a position of the actuator in any switching state of the switchgear unit.

Further advantages can be derived from the following description of the drawings. The drawings show two embodiments of the invention. The drawings, the description of the drawings, and the claims contain multiple features in combination. A person skilled in the art will expediently also consider the features in isolation and combine them to meaningful further combinations.

DETAILED DESCRIPTION OF THE DRAWINGS

Figure 1:
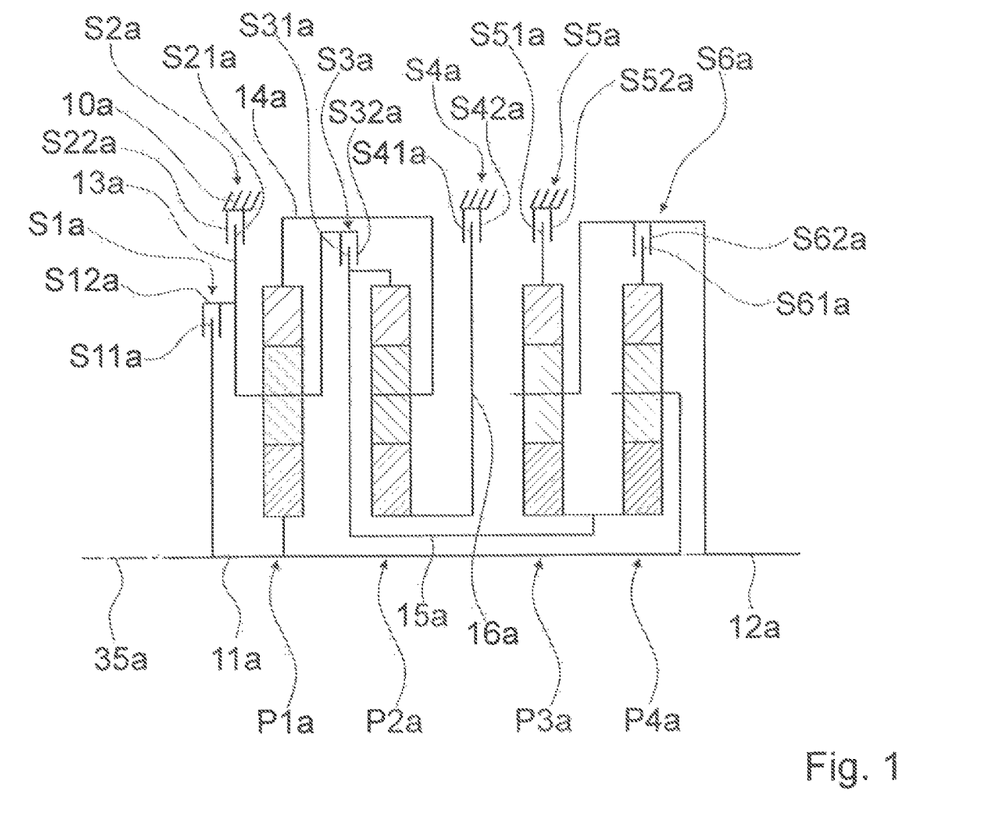
FIG. 1 shows a transmission diagram for a motor vehicle transmission.

FIG. 1 shows a transmission diagram for a generally known motor vehicle transmission. The motor vehicle transmission is designed as multistage transmission. The depicted motor vehicle transmission comprises a transmission housing 10a and four planetary gear stages P1a, P2a, P3a, P4a, as well as six switchgear units S1a, S2a, S3a, S4a, S5a, S6a, which are arranged inside the transmission housing 10a. The motor vehicle transmission further comprises a multiplicity of gear shafts 11a, 12a, 13a, 14a, 15a, 16a. Each of the planetary gear stages P1a, P2a, P3a, P4a comprises a sun gear, a hollow wheel, and a planetary gear support as well as planetary gears. The switchgear units S1a, S2a, S3a, S4a, S5a, S6a each comprise two coupling elements S11a, S12a, S21a, S22a, S31a, S32a, S41a, S42a, S51a, S52a, S61a, S62a. The coupling elements S11a, S12a, S21a, S22, S61a, S62 of the switchgear units S1a, S2a, S6a, which are designed as clutches, are each rotatably mounted. The one coupling element S31a, S41a, S51a of the switchgear units S3a, S4a, S5a designed as brakes is arranged rotatably mounted, while the other coupling element S32a, S42a, S52 of these switch gear units S3a, S4a, S5a is arranged securely on the housing. The coupling elements S11a, S12a, S21a, S22a, S31a, S41a, S51a, S61a, S62a are to some extent directly connected to at least one of the sun gears, hollow wheels and/or planetary gear supports. The gear shafts 11a, 12a, 13a, 14a, 15a, 16a connect the coupling elements, sun gears, hollow wheels and/or planetary gear supports to one another, when they are arranged at a distance from one another.

The motor vehicle transmission further comprises a multiplicity of actuators which are provided for actuating the switchgear units S1a, S2a, S3a, S4a, S5a, S6a. Each of the switchgear units S1a, S2a, S3a, S4a, S5a, S6a comprises one of the actuators which is provided for closing and/or opening the corresponding switchgear units S1a, S2a, S3a, S4a, S5a, S6a. The actuators can be designed differently. Basically, the actuators can be designed so as to be electromechanical, hydraulic and/or pneumatic. In the depicted embodiment, at least the actuators of the switchgear units S3a, S6a are designed so as to be electromechanical. In the following, only the actuator 17a of the switchgear unit S3a shall be described. The actuator of the switchgear unit S6a, which is not depicted in detail, can be designed analogously.

For controlling the actuators, the motor vehicle transmission further comprises an open-loop and closed-loop control unit 18a. The open-loop and closed-loop control unit 18a is designed in accordance with the actuators. If at least one part of the actuators is designed so as to be hydraulic, the open-loop and closed-loop control unit 18a comprises at least one hydraulic component for controlling these actuators. If, as in the present embodiment, at least one part of the actuators is designed so as to be electromechanical, the open-loop and closed-loop control unit 18a is provided for controlling these actuators. In addition, the open-loop and closed-loop control unit 18a is provided for supplying the actuators with energy, wherein an energy supply, on the basis of the design of the actuators, is designed as pressure oil supply or as an electric energy supply.

The two switchgear units S3a, S6a designed as clutches are arranged inboard. Installation spaces provided for the two switchgear units S3a, S6a are delimited in axial direction and in radial direction by a part of the planetary gear stages P1a, P2a, P3a, P4a and/or the gear shafts 11a, 12a, 13a, 14a, 15a, 16a. The installation spaces provided for the two switchgear units S3a, S6a are particularly not only delimited by the transmission housing 10a. In the depicted transmission diagram, the installation space provided for the switchgear unit S3a is delimited by the first planetary gear stage P1a, the gear shaft 15a, and the gear shaft 14a. An analogous installation situation can be found in the second switchgear unit S6a arranged inboard (see FIG. 1).

The inboard switchgear units S3a, S6a comprise the electromechanically designed actuators. Analogously, the two actuators are connected to the open-loop and closed-loop control unit 18a. Therefore, in the following description, reference is made particularly to a connection between the open-loop and closed-loop control unit 18a and the actuator 17a of the first inboard switchgear unit S3a. A connection between the open-loop and closed-loop control unit 18a and the actuator of the second switchgear unit S6a, which is not depicted in detail, can be designed analogously.

Figure 2:
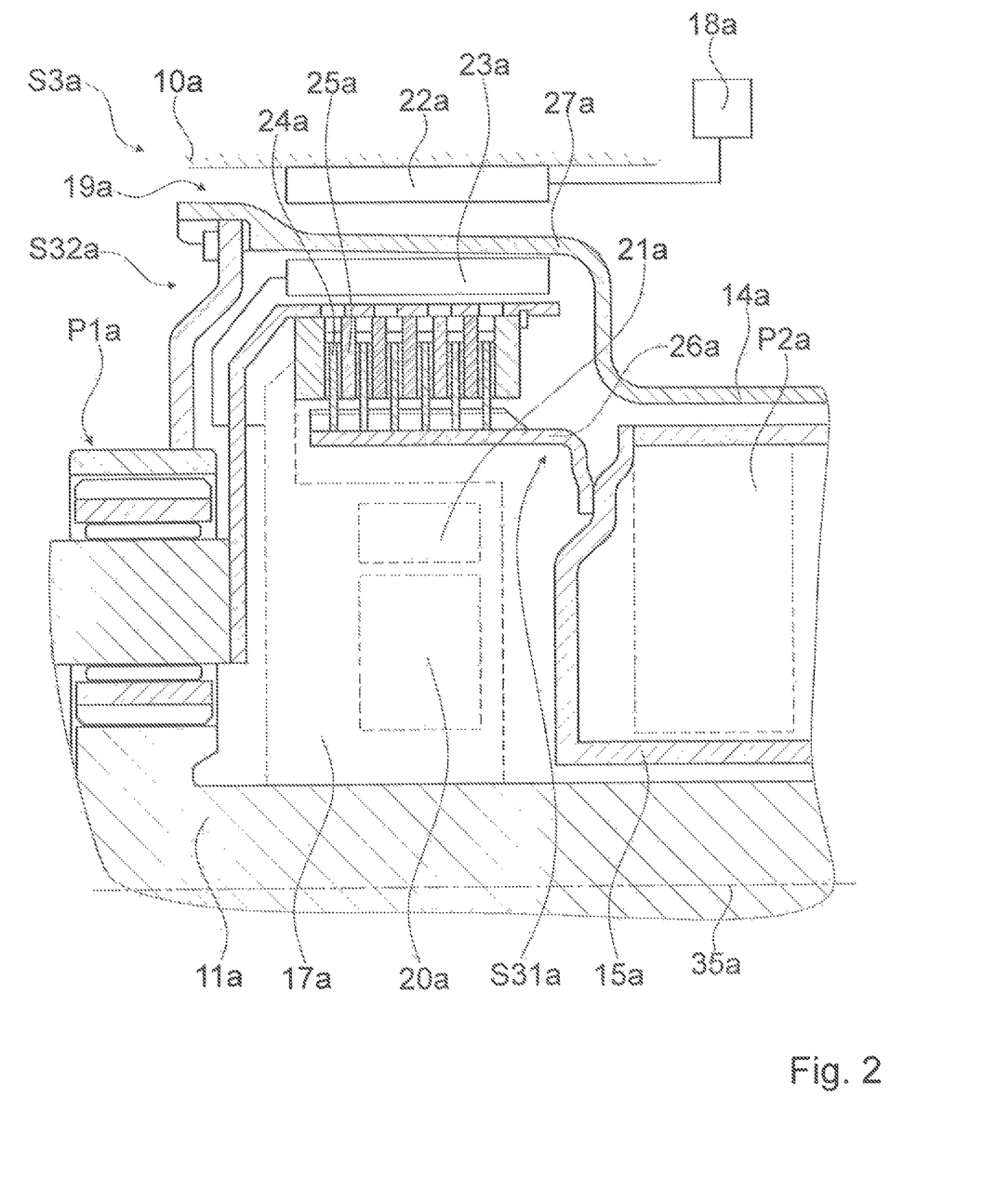
FIG. 2 shows a section from the motor vehicle transmission in a schematized depiction with a switch gear unit.

In order to connect the open-loop and closed-loop control unit 18a to the actuator 17a, the motor vehicle transmission comprises an inductive connector unit 19a (see FIG. 2). The open-loop and closed-loop control unit 18a forms an energy supply which is provided to supply the actuator 17a of the switchgear unit S3a with electric energy. The inductive connector unit 19a is provided to transmit the electric energy. A maximum electric power transmittable by the connector unit 19a corresponds to a power that is maximally required by the actuator 17a. In such case, the actuator 17a is connected to the open-loop and closed-loop control unit 18a only by means of the inductive conductor unit 19a. An additional connection provided for the transmission of power to the actuator 17a is omitted. During operation, the actuator 17a consumes power of no more than 50 watts. The inductive connector unit 19a is provided for transmitting power of up to 100 watts.

The inductive connector unit 19a is further provided for transmitting control signals for controlling the actuator 17a. The actuator 17a comprises an electronic unit 20a which is connected to the open-loop and closed-loop control unit 18a by means of the connector unit 19a. The electronic unit 20a is provided for evaluating the control signals supplied by the open-loop and closed-loop control unit 18a and to convert them into a corresponding switching operation.

The connector unit 19a is provided for a bidirectional signal transmission. The electronic unit 20a of the actuator is provided to supply status signals which are transmitted by the connector unit 19a to the open-loop and closed-loop control unit 18a. The actuator 17a comprises a sensor unit 21a, which is connected to the electronic unit 20a and provided for detecting different parameters during an operation and/or a switching operation. For example, the sensor unit 21a can be provided for the detection of a temperature of the switchgear unit S3a, particularly, if the switchgear unit S3a, as in the depicted embodiment, is provided for a friction-type connection of the coupling elements S31a, S32a. In addition, the sensor unit 21a can, for example, be provided for the detection of a current switch position and/or speeds of the coupling elements S31a, S32a.

The inductive connector unit 19a comprises a primary coil 22a on the side of the housing, the primary coil 22a being connected to the open-loop and/or closed-loop control unit 18a, and a secondary coil 23a on the side of the clutch, the secondary coil 23a being connected to the electronic unit 20a of the actuator 17a. The primary coil 22a is arranged securely on the housing. The secondary coil 23a is arranged immovably with regard to the electronic unit 20a. The electronic unit 20a and the secondary coil 23a are preferably firmly connected to one of the coupling elements S31a, S32a or at least immovably arranged with regard to one of the coupling elements S31a, S32a.

In the depicted embodiment, the switchgear unit S3a is designed as a multi-plate clutch. It comprises a pack of plates with alternately arranged clutch plates 24a, 25a which are provided for a frictional connection with one another. The switchgear unit S3a comprises an inner plate carrier 26a which, at least to some extent, forms the first coupling element S31a, and an outer plate carrier 27a which, at least to some extent, forms the second coupling element S32a. The first coupling element S31a is permanently non-rotatably connected to the hollow wheel of the second planetary gear stage P2a and the gear shaft 15a. The second coupling element S32 is permanently non-rotatably connected to the planetary gear support of the first planetary gear stage P1a.

The outer plate carrier 27a forms a coil carrier for the secondary coil 23a, Therefore, the secondary coil 23a is firmly connected to the outer plate carrier 27a. The primary coil 22a is connected to the transmission housing 10a. The primary coil 22a and the secondary coil 23a are arranged at a distance from one another. The gear shaft 14a, which in the depicted embodiment connects the hollow wheel of the first planetary gear stage P1a with the planetary gear support of the second planetary gear stage P2a, penetrates a gap between the primary coil 22a and the secondary coil 23a.

The gear shaft 14a consists of a material with a low magnetic permeability. The permeability of the materials is particularly lower than that of soft metal. In the depicted embodiment, the gear shaft 14a is made of a carbon fiber composite material. Basically, the gear shaft 14a can also be made of other materials, preferably plastic materials or plastic composite materials. In particular, it is conceivable that the gear shaft 14a consist only to some extent of a material with low magnetic permeability, particularly if the gear shaft 14a is a multi-piece gear shaft. Preferably, the gear shaft 14a consists of a material with low magnetic permeability at least in an area which is spanned by the primary coil 22a and the secondary coil 23a.

The electromechanical actuator 17a is designed so as to be mechanically self-locking. The energy supply of the actuator 17a is particularly used for the adjustment of the switchgear unit S3a. A current switching state of the switchgear unit S3a can be retained without the actuator 17a having to be supplied with electric power. The actuator 17a retains the switching state in a purely mechanical manner. A retaining force for retaining the switching state is provided by an inner friction of the actuator 17a. In particular, the actuator 17a has no interlocking locking or catch mechanism.

Figure 3:
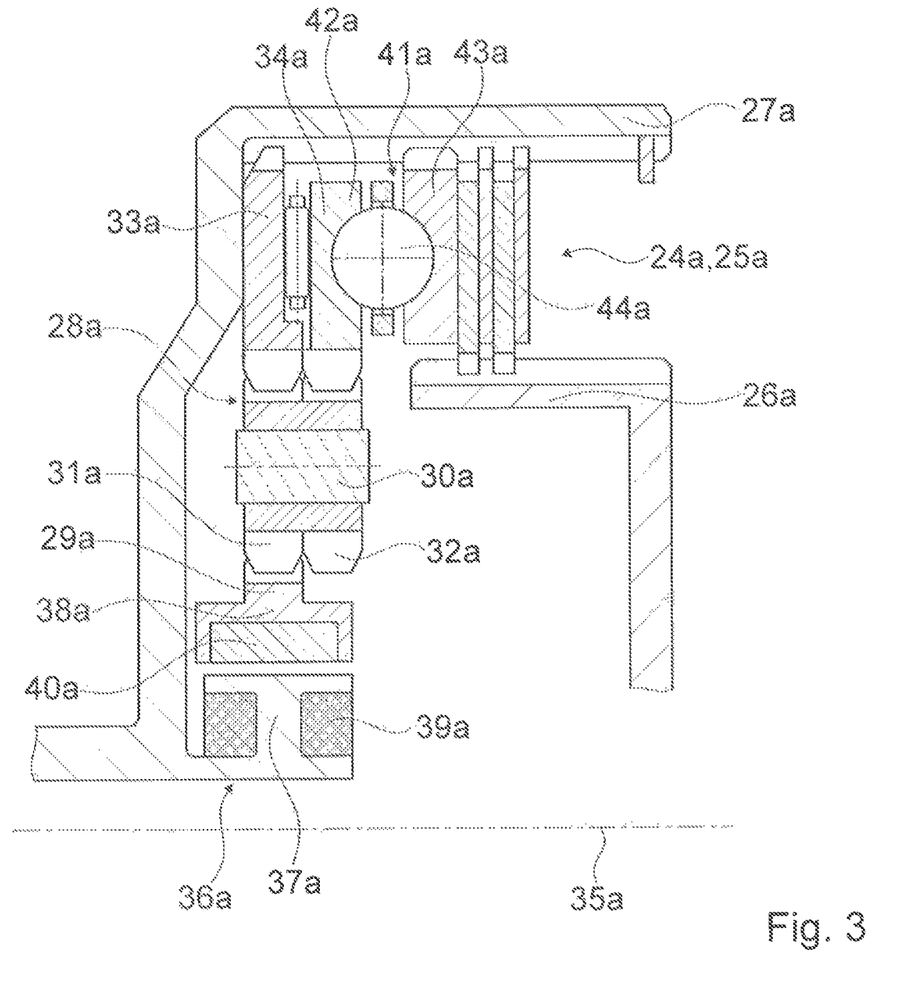
FIG. 3 shows an actuator of the switchgear unit.

The actuator 17a comprises a planetary gear train 28a according to the Wolfrom principle (see FIG. 3). The planetary gear train 28a comprises a sun gear 29a, a planetary gear support 30a, planetary gears 31a, 32a as well as two hollow wheels 33a, 34a. The motor vehicle transmission has a main rotational axis 35a, wherein the sun gear 29a, the planetary gear support 30a and the hollow wheels 33a, 34a are arranged coaxially to one another with regard to the main rotational axis 35a. The sun gear 29a, planetary gear support 30a and the second hollow wheel 34a are rotatably mounted. They are rotatable particularly with regard to the gear shaft 11a, which penetrates the switch gear unit S3a, and with regard to the coupling elements S31a, S32a of the switchgear unit S3a. The first hollow wheel S3a is non-rotatably supported. In the depicted embodiment, the first hollow wheel 33a is non-rotatably connected to the second coupling element S32a. The planetary gear support 30a and the sun gear 29a can be mounted by means of the hollow wheels 33a, 34a.

The planetary gears 31a, 32a are rotatably mounted on the planetary gear support 30a. Two planetary gears 31a, 32a each are coaxially arranged to one another and form a planetary gear pairing. FIG. 2 only shows the two planetary gears 31a, 32a of the one planetary gear pairing. Further planetary gears can be arranged analogously. The planetary gears 31a, 32a of the planetary gear pairing are integral with one another. Alternatively, a multi-piece design is also conceivable, in which the planetary gears 31a, 32a are non-rotatably connected to one another in pairs. The first planetary gear 31a of the planetary gear pairing meshes with the sun gear 29a and the first hollow wheel 33a. The second planetary gear 32a of the planetary gear pairing meshes with the second hollow wheel 34a. The first planetary gear 31a and the second planetary gear 32a have the same number of teeth.

The planetary gear train 28a has a gear transmission ratio which depends particularly on a difference of number of teeth of the hollow wheels 33a, 34a. In the depicted embodiment, the second hollow wheel 34a has one more tooth than the first hollow wheel 33a. The gear transmission ratio of the planetary gear train 28a lies between 200 and 250, wherein a rotational movement of the sun gear 29a is converted into a slower rotational movement of the second hollow wheel 34a.

The actuator 17a has an electromotor 36a which is integrated in the planetary gear train 28a. With regard to the first hollow wheel 33a, the electromotor 36a has a stationarily arranged stator 37a and a rotor 38a which is non-rotatably connected to the sun gear 29a. The stator 37a is non-rotatably connected to the second coupling element S32a. The rotor 38a is to some extent integral with the sun gear 29a. The stator 37a comprises a multiplicity of coils 39a which are provided for generating an electromagnetic field. The rotor 38a comprises a multiplicity of permanent magnets 40a which effect a drive torque by interacting with the electromagnetic field generated by the coils 39a. The electromotor 36a is designed as a stepping motor. It is conceivable that a different type of electromotor is used for the electromotor 36a.

On its outer circumference, the sun gear 29a has a toothily for an operative connection with the planetary gears 31a, 32a. On its inner circumference, the sun gear 29a forms a receiving area for the permanent magnets 40a of the rotor 38a. The sun gear 29a is designed as one piece. The permanent magnets 40a are evenly distributed over the inner circumference of the sun gear 29a. An arrangement of the permanent magnets 40a and an arrangement of the coils 39a are synchronized with one another.

The sun gear 29a receives the electromotor 36a. The sun gear 29a generates an installation space, in which the rotor 38a with the permanent magnets 40a and the stator 37a with the coils 39a is arranged. An axial width of the electromotor 36a, which is defined by the dimensions of the coils 39a and/or the permanent magnets 40a along the main rotational axis 35a, is smaller than an axial width of the sun gear 29a. The electromotor 36a is in its entirety arranged within the sun gear 29a.

The electronic unit 20a of the actuator 17a is arranged adjacent to the electromotor 36a. With regard to the stator 37a of the electromotor 36a, the electronic unit 20a is arranged stationarily. It is also firmly connected to the second coupling element S32a. The electronic unit 20a is provided for adjusting an energization for the electromotor 36a, The coils 39a of the electromotor 36a are connected to the electronic unit 20a. During operation, the electronic unit 20a receives the control signals provided by the open-loop and closed-loop control unit 18a, the control signals being transmitted by the connector unit 19a, and adjusts an energization which corresponds to the control signals. By means of the energization, the electronic unit 20a presets particularly a rotational direction and a rotational speed of the electromotor 36a. Since the electromotor 36a is designed as a stepping motor, a sensor for determining a current angular position of the electromotor 36a can be omitted. The electronic unit 20a transmits the current angular position as status signal to the open-loop and closed-loop control unit 18a.

In order to apply an actuating force, which acts along the main rotational axis 35a, to the clutch plates 24a, 25a, the actuator 17a comprises a spreading mechanism 41a. The spreading mechanism 41a is provided for converting a relative movement between the second coupling element S32a and the first hollow wheel 34a into a linear movement. In the depicted embodiment, the spreading mechanism 41a comprises two spreading elements 42a, 43a and at least one rolling element 44a arranged between the spreading elements 42a, 43a, The spreading elements 42a, 43a each have at least one running surface 45a, 46a, on which the rolling element 44a rolls off. The running surfaces 45a, 46a are arranged to one another at an acute angle. In case of a relative movement, the at least one rolling element 44a pushes the spreading elements 42a, 43a apart.

Figure 4:
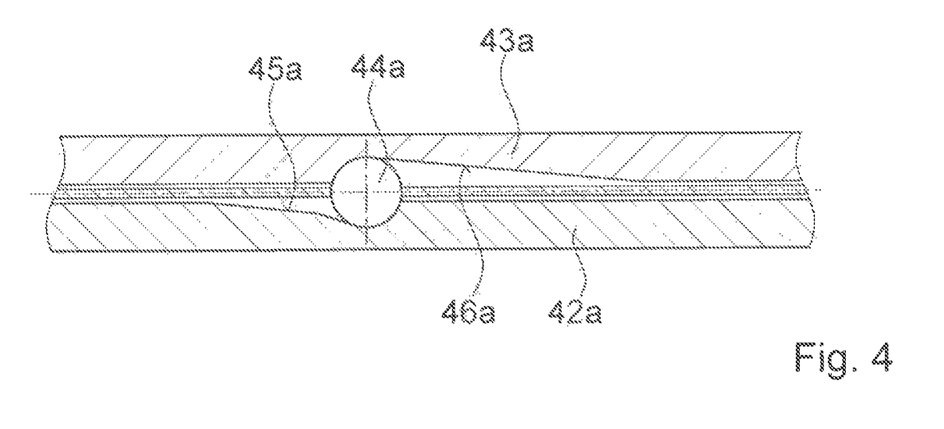
FIG. 4 shows a depiction of a spreading mechanism of the actuator.

In the depicted embodiment, the running surface 45a of the first spreading element 42a forms a degressive ramp (see FIG. 4). A form of the running surface 45a corresponds to a convex curvature. The running surface 46a of the second spreading element 43a forms a linear ramp. Alternatively, it is possible that only one of the running surfaces 45a, 46a forms a ramp. Basically, different designs with one or two ramps and/or different shapes of the ramps are conceivable. The running surfaces 45a, 46a are free of indentations which are provided for catching the rolling element 44a. Spreading springs, which are not depicted in detail, for separating the clutch plates 24a, 25a provide a pressure force for a permanent contact between the spreading elements 42a, 43a and the rolling element 44a.

During operation, the electromotor 36a drives the sun gear 29a. A rotational movement of the sun gear 29a is converted by the planetary gears 31a, 32a into a slower rotational movement of the second hollow wheel 34a. The spreading mechanism 41a transforms the rotational movement of the second hollow wheel 34a into the linear movement which provides an actuating force for the switchgear unit S3a. In such case, a transmission gear ratio of the planetary gear train 28a is great enough that a torque acting on the second hollow wheel 34a by means of the spreading mechanisms 41a during the retention of any switching state, is supported by the inner friction of the planetary gear train 28a. During the retention of any switching state, the electromotor 36a is force-free.

Figure 5:
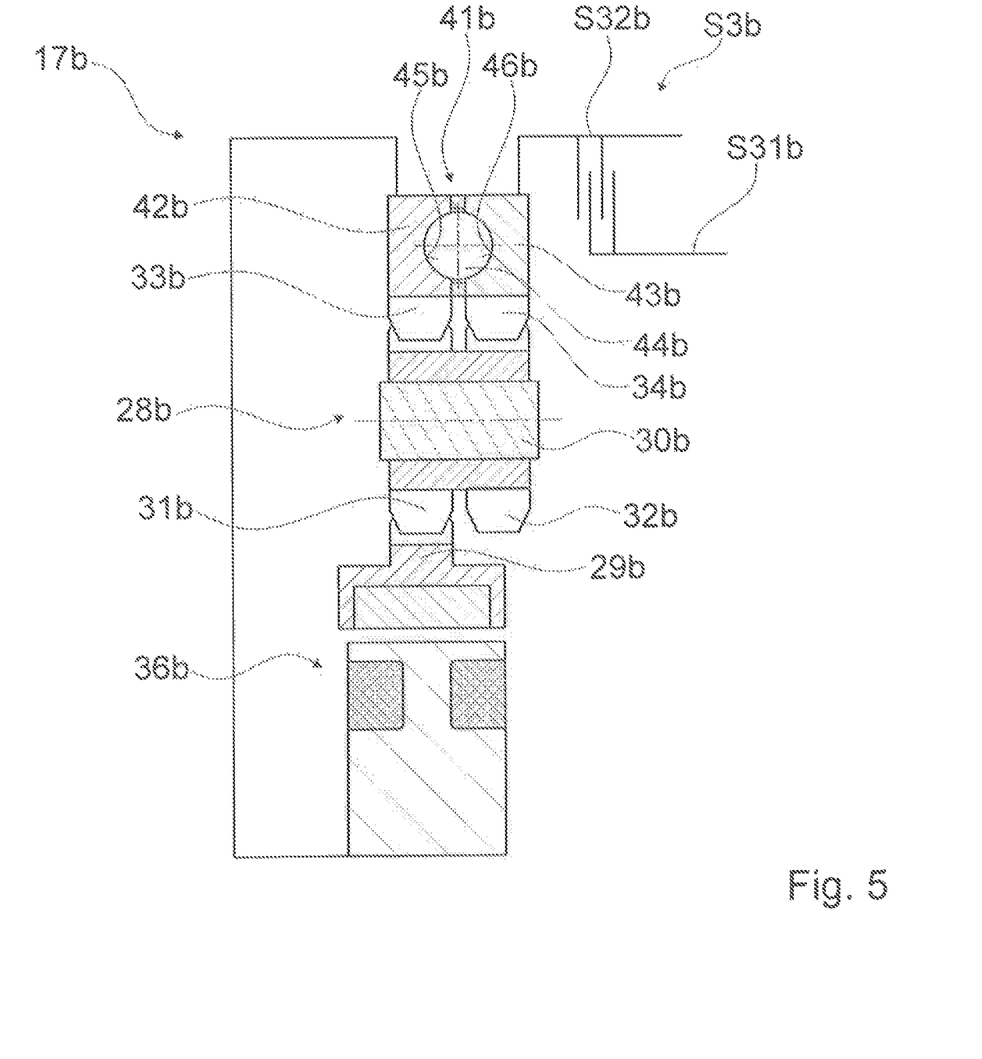
FIG. 5 shows an actuator with an alternatively designed spreading mechanism.

FIG. 5 shows a further embodiment of the invention. The following descriptions are essentially limited to the differences between the embodiments, wherein with regard to similar components, features, and functions, reference can be made to the description of the embodiment of FIGS. 1 to 4. For differentiating the embodiments, the letter a in the reference signs of the embodiment in FIGS. 1 to 4 will be substituted by the letter h in the reference signs of the embodiment of FIG. 5. With regard to similarly denoted components, particularly regarding components with the same reference signs, reference can basically also be made to the drawings and/or the description of the embodiment of FIGS. 1 to 4.

FIG. 5 shows an alternative design of a switchgear unit S3b of a motor vehicle transmission. The switchgear unit S3b comprises two coupling elements S31b, S32b, which are rotatable relative to one another and non-rotatably connected to one another, as well as an electromechanical actuator 17b which is designed so as to be mechanically self-locking. The actuator 17b has a planetary gear train 28b according to the Wolfrom principle. The planetary gear train 28b comprises a sun gear 29b, a planetary gear support 30b, planetary gears 31b, 32b arranged in pairs on the planetary gear support 30b, as well as two hollow wheels 33b, 34b, wherein one of them is non-rotatably connected to one of the coupling elements S31b, S32b.

The actuator 17b further comprises an electromotor 36b which at least to some extent is integrated in the planetary gear train 28b. For actuating the switchgear unit S3b, the actuator 17b has a spreading mechanism 41b which is provided for converting a relative rotational movement between the coupling element S32b, which is firmly connected to the one hollow wheel 33b, and the second hollow wheel 34b into a linear movement.

In contrast to the previous embodiment, the spreading mechanism 41b is arranged between the two hollow wheels 33b, 34b. The spreading mechanism 41b has two spreading elements 42b, 43b which are formed by the hollow wheels 33b, 34b. The spreading mechanism 41b further comprises at least one rolling element 44b which is arranged between the spreading elements 42b, 43b. The spreading elements 42b, 43b each have at least one running surface 45b, 46b. The running surfaces 45b, 46b are introduced directly into the hollow wheels 33b, 34b. At least one of the running surfaces 45b, 46b forms a ramp. The spreading mechanism 41b simultaneously forms a system for mounting the two hollow wheels 33b, 34b relative to one another.

LIST OF REFERENCE SIGNS

10 Transmission housing
11 Gear shaft
12 Gear shaft

13 Gear shaft
14 Gear shaft
15 Gear shaft
16 Gear shaft
17 Actuator
18 Open-loop and/or closed-loop control unit
19 Connector unit
20 Electronic unit
21 Sensor unit
22 Primary coil
23 Secondary coil
24 Clutch plate
25 Clutch plate
26 Inner plate carrier
27 Outer plate carrier
28 Planetary gear train
29 Sun gear
30 Planetary gear support
31 Planetary gear
32 Planetary gear
33 Hollow wheel
34 Hollow wheel
35 Main rotational axis
36 Electromotor
37 Stator
38 Rotor
39 Coils
40 Permanent magnet
41 Spreading mechanism
42 Spreading element
43 Spreading element
44 Rolling element
45 Running surface
46 Running surface
P1 Planetary gear stage
P2 Planetary gear stage
P3 Planetary gear stages
P4 Planetary gear stages
S1 Switchgear unit
S2 Switchgear unit
S3 Switchgear unit
S4 Switchgear unit
S5 Switchgear unit
S6 Switchgear unit
S11 Coupling element
S12 Coupling element
S21 Coupling element
S22 Coupling element
S31 Coupling element
S32 Coupling element
S41 Coupling element
S42 Coupling element
S51 Coupling element
S52 Coupling element
S61 Coupling element
S62 Coupling element

The invention claimed is:

1. A motor vehicle transmission, comprising:
a switchgear unit which includes two coupling elements;
an electromechanical actuator, wherein the electromechanical actuator actuates the switchgear unit;
an open-loop and/or a closed-loop control unit, wherein the open-loop and/or the closed-loop control unit controls the electromechanical actuator; and
an inductive connector unit, wherein the inductive connector unit connects the open-loop and/or the closed-loop control unit to the electromechanical actuator and supplies the electromechanical actuator with electric energy;
wherein the inductive connector unit includes a primary coil on a side of a housing which is connected to the open-loop and/or the closed-loop control unit and a secondary coil on a side of a clutch which is connected to the electromechanical actuator;
wherein the electromechanical actuator includes a planetary gear train according to a Wolfrom principle, wherein the planetary gear train includes a sun gear, a planetary gear support, planetary gears disposed on the planetary gear support, and two hollow wheels, wherein one of the two hollow wheels is non-rotatably connected to one of the two coupling elements;
wherein the electromechanical actuator includes an electromotor which is, at least partially, integrated in the planetary gear train and wherein the electromechanical actuator has a spreading mechanism which converts a relative rotational movement into a linear movement;
wherein the spreading mechanism comprises two spreading elements which are formed respectively by the two hollow wheels, wherein the spreading mechanism further comprises a rolling element which is disposed between the two spreading elements, wherein the two spreading elements each have a running surface, and wherein at least one of the respective running surfaces forms a ramp.

2. The motor vehicle transmission according to claim 1, wherein the inductive connector unit transmits control signals for control and/or monitoring of the electromechanical actuator.

3. The motor vehicle transmission according to claim 1, wherein a gear shaft is disposed between the primary coil and the secondary coil and wherein the gear shaft consists at least partially of a material with a low magnetic permeability.

4. The motor vehicle transmission according to claim 1, wherein the electromechanical actuator is mechanically self-locking.

* * * * *